United States Patent
Lemke et al.

(10) Patent No.: US 11,299,057 B2
(45) Date of Patent: Apr. 12, 2022

(54) METHOD FOR CHARGING AN ELECTRICAL ENERGY STORE BY MEANS OF VOLTAGE PULSES

(71) Applicant: Robert Bosch GmbH, Stuttgart (DE)

(72) Inventors: Andreas Lemke, Berlin (DE); Stefan Teusch, Reutlingen (DE); Thomas Lang, Reutlingen (DE); Maximilian Hinninger, Erligheim (DE); Daniel Groezinger, Stuttgart (DE); Ulrich Schuetterle, Neckarsulm (DE)

(73) Assignee: Robert Bosch GmbH, Stuttgart (DE)

( * ) Notice: Subject to any disclaimer, the term of this patent is extended or adjusted under 35 U.S.C. 154(b) by 59 days.

(21) Appl. No.: 16/755,725

(22) PCT Filed: Sep. 20, 2018

(86) PCT No.: PCT/EP2018/075400
§ 371 (c)(1),
(2) Date: Apr. 13, 2020

(87) PCT Pub. No.: WO2019/072511
PCT Pub. Date: Apr. 18, 2019

(65) Prior Publication Data
US 2021/0188111 A1 Jun. 24, 2021

(30) Foreign Application Priority Data
Oct. 12, 2017 (DE) .................... 10 2017 218 263.6

(51) Int. Cl.
*B60L 53/62* (2019.01)
*B60L 53/22* (2019.01)
*B60L 58/12* (2019.01)
(Continued)

(52) U.S. Cl.
CPC .............. *B60L 53/62* (2019.02); *B60L 3/0046* (2013.01); *B60L 53/22* (2019.02); *B60L 58/12* (2019.02);
(Continued)

(58) Field of Classification Search
CPC .......... B60L 53/62; B60L 53/22; B60L 58/12; B60L 3/0046; B60L 2210/10;
(Continued)

(56) References Cited

U.S. PATENT DOCUMENTS 5,442,274 A    8/1995   Tamai
6,040,684 A    3/2000   Mitchell
(Continued)

FOREIGN PATENT DOCUMENTS

EP    0820138      1/1998
JP    201081712    4/2010

OTHER PUBLICATIONS

International Search Report for Application No. PCT/EP2018/075400 dated Oct. 24, 2018 (English Translation, 2 pages).

*Primary Examiner* — Paul Dinh
(74) *Attorney, Agent, or Firm* — Michael Best & Friedrich LLP

(57) ABSTRACT

The invention relates to a method for charging an electrical energy store, the electrical energy store comprising at least one electrical energy storage unit and a predefined maximum permissible energy-store voltage limit value being specified for the electrical energy store. The electrical energy store is charged with a pulsed charging voltage, a maximum value of the pulsed charging voltage being greater than the predefined maximum permissible energy-store voltage limit value over a pulse duration in the case of at least one pulse. The invention further relates to a corresponding device for charging the electrical energy store, to a corresponding (Continued)

computer program, to a corresponding machine-readable storage medium and to a corresponding electrical energy store.

10 Claims, 3 Drawing Sheets

(51) Int. Cl.
  *H02J 7/00* (2006.01)
  *B60L 3/00* (2019.01)
  *H01M 10/44* (2006.01)

(52) U.S. Cl.
  CPC .......... *H01M 10/44* (2013.01); *H02J 7/0013* (2013.01); *H02J 7/00711* (2020.01); *H01M 2220/20* (2013.01); *H02J 2310/48* (2020.01)

(58) Field of Classification Search
  CPC ................. H02J 7/00711; H02J 7/0013; H02J 2310/48; H02J 7/007; H01M 10/44; H01M 2220/20; Y02T 90/12; Y02T 90/14; Y02T 10/7072; Y02T 10/70; Y02T 10/72; Y02E 60/10

USPC ........................................................ 320/139
See application file for complete search history.

(56) References Cited

U.S. PATENT DOCUMENTS

| | | |
|---|---|---|
| 6,094,033 A | 7/2000 | Ding et al. |
| 2003/0160594 A1 | 8/2003 | Trinh et al. |
| 2004/0032237 A1 | 2/2004 | Dykeman |
| 2006/0098390 A1* | 5/2006 | Ashtiani ................. B60K 6/28 361/502 |
| 2006/0192531 A1* | 8/2006 | Nishida ................. H02J 7/0071 320/128 |
| 2008/0203969 A1* | 8/2008 | Kurihara .............. H02J 7/00711 320/116 |
| 2010/0072951 A1 | 3/2010 | Nakashima |
| 2010/0215994 A1 | 8/2010 | Kim |
| 2011/0156656 A1* | 6/2011 | Saito .................... H02J 7/0031 320/134 |
| 2013/0141828 A1 | 6/2013 | Yamaguchi et al. |

* cited by examiner

METHOD FOR CHARGING AN ELECTRICAL ENERGY STORE BY MEANS OF VOLTAGE PULSES

BACKGROUND OF THE INVENTION

The present invention is based on a method for charging an electrical energy store, a device for charging the electrical energy store, a corresponding computer program, a corresponding machine-readable storage medium and the electrical energy store, wherein the electrical energy store comprises an electrical energy storage unit and a predefined maximum permissible energy-store voltage limit value is specified for the electrical energy store.

In the course of the increasing electrification of vehicles, in particular motor vehicles, electrical energy stores consisting of a plurality of smaller units are increasingly being used. Most of these are battery packs, which are formed from a multiplicity of battery modules or battery cells, in particular based on lithium-ion technology. In order to ensure the safety of these energy stores, variables such as an electric current and an electric voltage of the electric energy store or the smaller units constituting the latter are usually monitored. If these variables exceed or fall below certain thresholds or limit values, this poses a risk to the safety of the electrical energy store. For this reason, care is taken, in particular with an upper maximum permissible energy-store voltage, and precautions are taken to ensure that the latter is not exceeded. For example, if this limit value is exceeded, switches, such as contactors, are opened to protect the energy store from damage.

If an electrical voltage by means of which an electrical energy store is to be charged exceeds the maximum permissible energy-store voltage, it cannot be used to charge the electrical energy store in a simple manner. For example, DC converters are used for a corresponding voltage conversion to reduce a charging voltage. This requires an additional electronic component.

Document U.S. Pat. No. 6,094,033 proposes a system and method for rapid charging of batteries. For example, current and voltage pulses of different lengths are used.

Document US 2013/141828 describes a battery monitoring system that disconnects the battery from the voltage supply in the event of overcharging or overdischarging.

SUMMARY OF THE INVENTION

In this regard, the electrical energy store, which comprises at least one electrical energy storage unit, is charged with a pulsed charging voltage, wherein a maximum value of the charging voltage is greater than a maximum permissible energy-store voltage limit value predefined for the electrical energy store for at least one pulse of the charging voltage over a pulse duration.

This energy-store voltage limit value is specified by the manufacturer of the electrical energy storage unit or of the electrical energy store and is regarded as safety-relevant. For example, the energy-store voltage limit value can be the energy-store voltage at a charge state of 100%, for example 4.2 V, or in the range between 4.1 V and 4.5 V, in particular 4.3 V to 4.4 V. In the case of two or more energy storage units, the energy-store voltage limit value is obtained accordingly by multiplication by the number of energy storage units. Due to the pulsed charging voltage, the energy-store voltage limit value is not continuously exceeded by the charging voltage, but only during the pulse duration, which does not entail damage to the energy store or the electrical energy storage unit. This is advantageous because the electrical energy store is thus charged with a charging voltage that is above its permissible energy-store voltage limit value and therefore, for example, no additional DC converter is required.

Advantageously, an electronic circuit which, for example, comprises power semiconductors, is driven in such a manner that a charging voltage applied to the electronic circuit, for example a direct voltage in the range between 12.5 V and 15 V, preferably between 13 V and 15 V, is converted by the electronic circuit into the pulsed charging voltage. Here, the voltage level of the charging voltage applied to the circuit is advantageously maintained, so that the pulsed charging voltage has the same voltage level, i.e., even in the range between 12.5 V and 15 V or between 13 V and 15 V. The continuous direct voltage, preferably in the above-mentioned voltage ranges, is thus converted into a pulsed direct voltage, wherein the voltage level is maintained. Thus, the electronic circuit can advantageously be implemented in a simple and cost-effective manner.

Advantageously, a charge state variable of the electrical energy store is determined. The charge state variable can comprise, for example, an electrical voltage of the energy store, preferably the so-called open-circuit voltage, or a charge state of the electrical energy store. The electrical voltage of the energy store can be determined, for example, between connecting poles of different polarity of the electrical energy store or can be determined as an electrical voltage dropping at the at least one electrical energy storage unit. Furthermore, a comparison of the determined charge state variable with a predefined charge state variable threshold value is carried out. If the charge state variable exceeds or reaches the predefined charge state variable threshold value, i.e. if the charge state variable is greater than or equal to the predefined charge state variable threshold value, the charging of the electrical energy store is interrupted. Here, the charge state variable threshold value can be identical with the predefined maximum permissible energy-store voltage limit value. Thus, overcharging of the electrical energy store is prevented in an advantageous manner. The safety of the electrical energy store is therefore not negatively affected.

Advantageously, the pulse duration of the pulsed charging voltage is shorter than or equal to half a pulse period. This means that an electrical voltage is only applied to the electrical energy store during a maximum of half of the pulse period, which is greater than the maximum permissible energy-store voltage limit value. This has the advantage that the risk of damage to the electrical energy store can be kept low.

Advantageously, the pulse duration of the pulsed charging voltage is less than 50 ms. This means that, advantageously, an electrical voltage above the maximum permissible energy-store voltage limit value is applied to the electrical energy store only for a maximum of 50 ms. The risk of damage to the electrical energy store can thus be minimized in an advantageous manner.

Advantageously, the mean value of the pulsed electrical charging voltage over the pulse duration is greater than the predefined maximum permissible energy-store voltage limit value. Thus, the electrical voltage during the pulse duration may optionally also be below the predefined maximum permissible energy-store voltage limit value. This can occur, for example, when a charging current flows that results in a correspondingly large voltage drop, for example at the electrical supply lines to the energy store. Thus, it is ensured in an advantageous manner that, at least on average, the charging voltage over the pulse duration is higher than the predefined maximum permissible energy-store voltage limit value.

Furthermore, subject matter of the disclosure is a device for charging an electrical energy store, wherein the electrical energy store comprises at least one electrical energy storage unit, and a predefined maximum permissible energy-store voltage limit value is specified for the electrical energy store. The device comprises an electronic circuit for connecting to the electrical energy store and at least one means for controlling the electronic circuit, which are configured to carry out the steps of the disclosed method. Said means may be, for example, an electronic control unit, in particular an electronic control device. Thus, the above-mentioned advantages of the disclosed method can be implemented.

Advantageously, the electronic circuit comprises two power semiconductor switches which are connected in series in opposite directions. This allows the switches to be switched on and off quickly, which is advantageous in order to minimize the risk of damage to the electrical energy store due to an excessively long application of electrical voltage.

Furthermore, subject matter of the disclosure is a computer program, which comprises commands which cause the disclosed device to carry out the method steps of the disclosed method. Thus, in addition to the above-mentioned advantages, a quick startup of the device is possible in an advantageous manner.

Furthermore, subject matter of the disclosure is a machine-readable storage medium on which the disclosed computer program is stored. Thus, a simple distribution of the disclosed computer program is possible, which enables a quick implementation of the mentioned advantages of the disclosed method.

Furthermore, subject matter of the disclosure is an electrical energy store, which comprises an electrical energy storage unit and the disclosed device, wherein a predefined maximum permissible energy-store voltage limit value is specified for the electrical energy store, as already described above. Thus, the above-mentioned advantages can be implemented and furthermore, a perfectly tailored adaption, for example, of the pulse duration to the respective electrical energy store is provided.

An electrical energy storage unit can be understood, in particular, as an electrochemical battery cell and/or a battery module with at least one electrochemical battery cell and/or a battery pack with at least one battery module. For example, the electrical energy storage unit can be a lithium-based battery cell or a lithium-based battery module or a lithium-based battery pack. In particular, the electrical energy storage unit may be a lithium-ion battery cell or a lithium-ion battery module or a lithium-ion battery pack. Furthermore, the battery cell may be a type of rechargeable lithium polymer battery, rechargeable nickel metal hydride battery, rechargeable lead-acid battery, rechargeable lithium air battery or rechargeable lithium sulfur battery or, more generally, a rechargeable battery of any electrochemical composition. A capacitor is also possible as an electrical energy storage unit.

The at least one means for controlling may comprise, for example, a battery management control device and corresponding power electronics, for example an inverter, as well as current sensors and/or voltage sensors and/or temperature sensors. An electronic control unit, in particular in the form of a battery management control device, can also be such a means.

An electronic control unit can be understood, in particular, as an electronic control device which comprises, for example, a microcontroller and/or an application-specific hardware component, e.g. an ASIC, but it may also include a personal computer or a programmable logic controller.

BRIEF DESCRIPTION OF THE DRAWINGS

Advantageous embodiments of the invention are illustrated in the figures and explained in more detail in the description below.

In the figures.

Identical reference numbers indicate identical device components or identical method steps throughout the figures.

DETAILED DESCRIPTION

Figure 1:
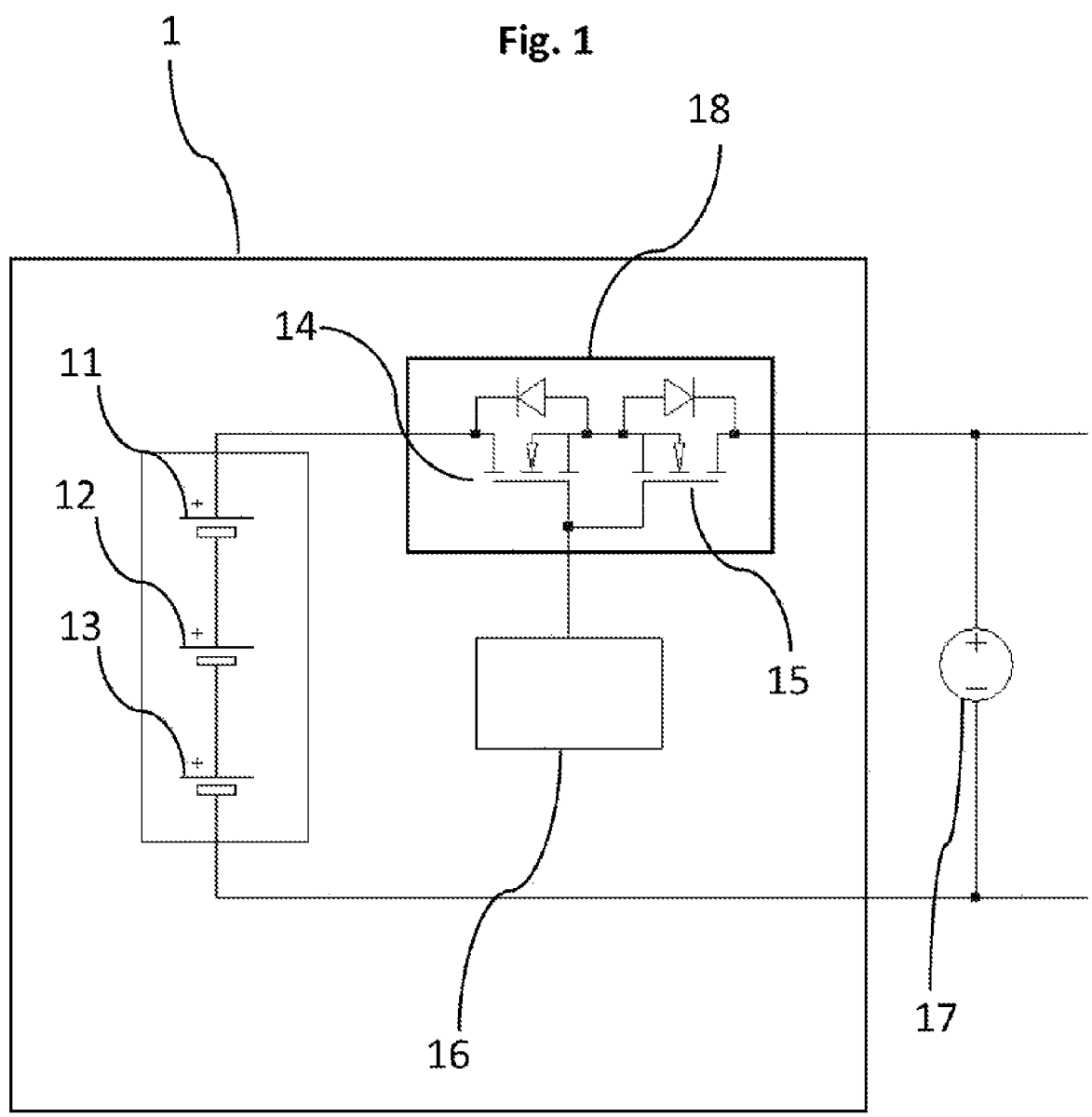
FIG. 1 shows a schematic illustration of the disclosed electrical energy store according to an embodiment.

FIG. 1 shows a schematic diagram of the disclosed electrical energy store 1 according to an embodiment. The electrical energy store comprises three electrical energy storage units 11, 12, 13, which are electrically connected to one another in series. Furthermore, the electrical energy store 1 includes an electronic circuit 18, which comprises two field effect transistors 14, 15. In order to control the electronic circuit 18, an electronic control unit 16 is provided which opens or closes the field effect transistors in the sense of a switch. The charging voltage necessary for charging the electrical energy storage units, which is converted by the circuit 18 into the pulsed charging voltage, is generated by a generator 17. Here, the electrical voltage, in particular a direct voltage, generated by the generator is greater than a predefined maximum permissible energy-store voltage limit value of the energy store. Further electrical components, for example an electric pump, can be connected to the corresponding electrical lines connecting the above-mentioned components, wherein the entirety thereof forms the electrical on-board network of a motor vehicle, for example.

Figure 2:
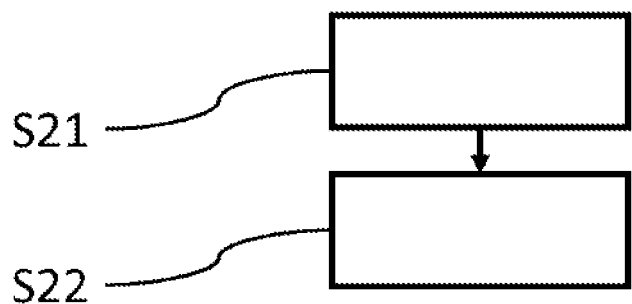
FIG. 2 shows a flow chart of the disclosed method according to a first embodiment.

FIG. 2 shows a flow chart of the disclosed method according to a first embodiment. The method is used to charge an electrical energy store which comprises at least one electrical energy storage unit, wherein a predefined maximum permissible energy-store voltage limit value is specified for the electrical energy store. In a first step S21, an electronic circuit as shown, for example, in FIG. 1, is driven in such a manner that an electrical charging voltage applied to the electronic circuit, such as the one applied, for example, in FIG. 1 to the right-hand side of the electronic circuit 18, is converted into a pulsed electrical charging voltage by means of the electronic circuit.

Figure 4:
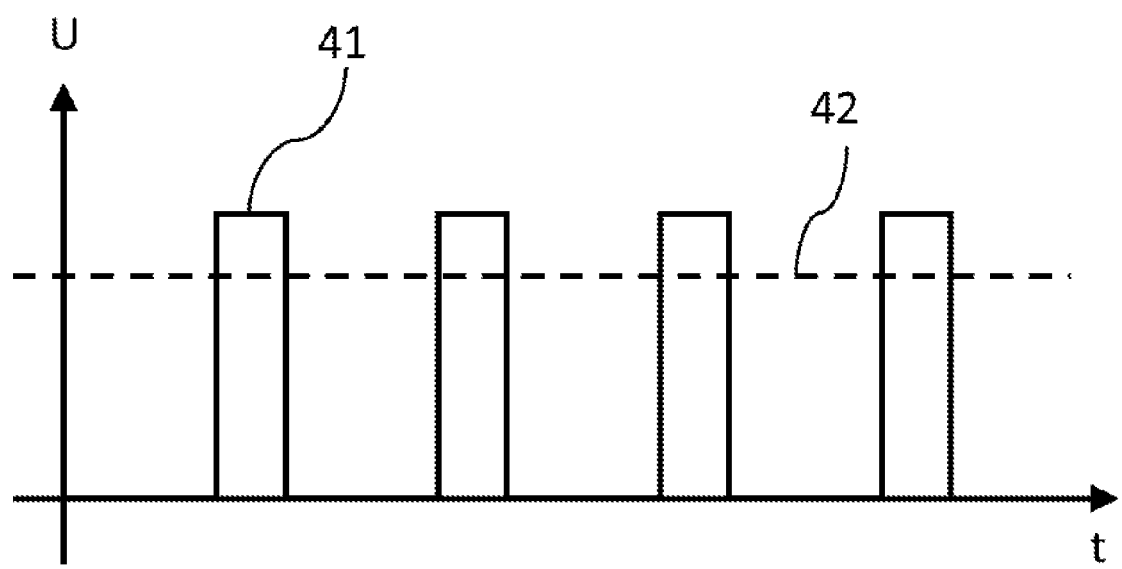
FIG. 4 shows a schematic illustration of a temporal progression of the disclosed pulsed electrical charging voltage.

The pulsed electrical charging voltage is used in a second step S22 to charge the electrical energy store, wherein for at least one pulse over a pulse duration a maximum value of the pulsed electrical charging voltage is greater than the predefined maximum permissible energy-store voltage limit value. This is shown in FIG. 4, for example.

With each pulse, electrical energy is supplied to the electrical energy store. The charging of the electrical energy store and the generation of the pulses thus take place simultaneously, except for the generation of the first pulse, until a desired or predefined charge state level of the electrical energy store is reached.

Figure 3:
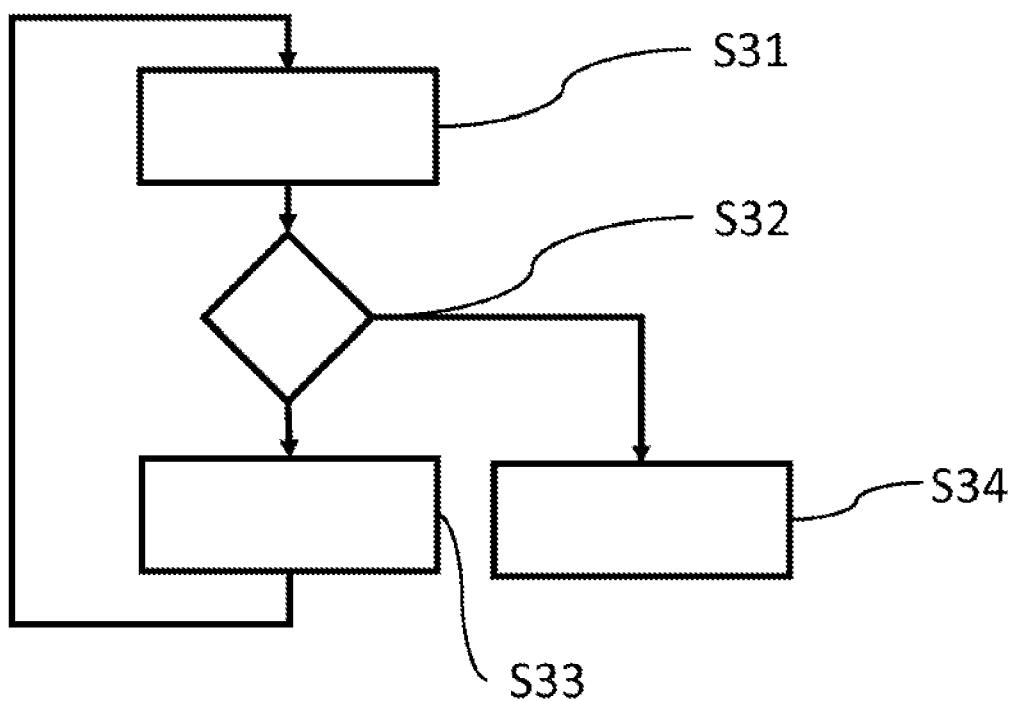
FIG. 3 shows a flow chart of the disclosed method according to a second embodiment.

FIG. 3 shows a flow chart of the method according to the invention according to a second embodiment. The method is used to charge an electrical energy store which, as shown in FIG. 1, comprises three electrical energy storage units, wherein a predefined maximum permissible energy-store voltage limit value is specified for the electrical energy store. In a first step S31, the charge state of the electrical energy store is determined. This is done based on an electrical voltage of the electrical energy store, which can be measured, for example, at connecting poles of different polarity of the electrical energy store. Furthermore, it is also possible to use the electrical voltage between the three electrical energy storage units to determine the charge state. As a result, voltage drops across the lines or the electronic circuit are avoided, for example, which makes the determination of the charge state more accurate.

In a second step S32, the determined charge state of the electrical energy store is compared with a predefined charge state threshold value, for example 100%, which, for the three electrical energy storage units shown in FIG. 1, corresponds to an open-circuit voltage of 12.6 V, for example.

If the charge state thus determined exceeds or reaches the predefined charge state threshold value, thus, is greater than or equal to the predefined charge state threshold value, charging of the electrical energy store is interrupted in a fourth step S34.

If the determined charge state is less than the predefined charge state variable threshold value, the electrical energy store is charged with a pulsed electrical charging voltage in a third step S33, wherein for at least one pulse over a pulse duration a maximum value of the pulsed electrical charging voltage is greater than the predefined maximum permissible energy-store voltage limit value. Determining and checking the charge state takes place continuously or at regular intervals.

FIG. 4 shows a schematic illustration of a temporal progression 41 of the disclosed pulsed electrical charging voltage, as it results from the method disclosed according to FIG. 2 or FIG. 3, for example. A time t is plotted on the abscissa axis and values of an electric voltage U, in this case the pulsed electrical charging voltage, are plotted on the ordinate axis. The dashed line 42 represents a maximum permissible energy-store voltage limit value predefined for an electrical energy store. This energy-store voltage limit value is exceeded by the pulsed electrical charging voltage during each pulse duration. Furthermore, it can be seen that the pulse duration is in each case shorter than half of a pulse period. During a large part of each pulse period, the electrical energy store is therefore not subjected to an electrical voltage that is greater than the predefined maximum permissible energy-store voltage limit value.

Figure 5:
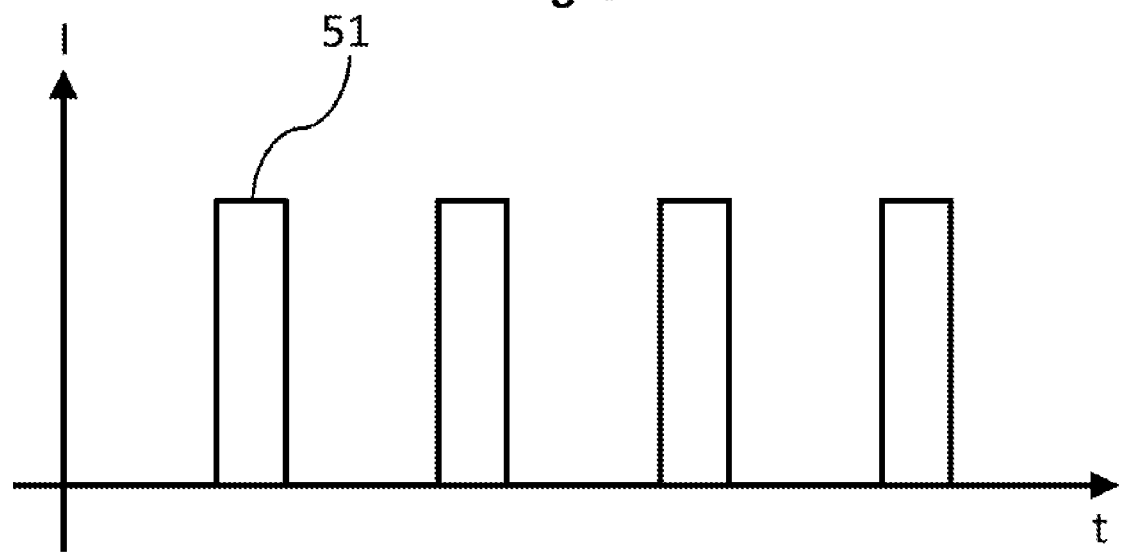
FIG. 5 shows a schematic illustration of a temporal progression of the charge current resulting from the pulsed electrical charging voltage.

FIG. 5 shows a schematic illustration of a temporal progression 51 of the charge current resulting from a pulsed electrical charging voltage as shown, for example, in FIG. 4. The pulsed electrical charging voltage results in a pulsed charge current. Due to inductive and/or capacitive behavior of the energy store, the pulse shape of the current pulses can deviate from the rectangular shape shown in FIG. 5. For example, a more or less triangular current pulse shape may result.

The invention claimed is:

1. A method for charging an electrical energy store (1) that includes at least one electrical energy storage unit (11, 12, 13), wherein a maximum permissible energy-store voltage limit value is specified for the electrical energy store (11, 12, 13), the method comprising:
    a) charging the electrical energy store (1) with a pulsed electrical charging voltage, wherein for each of a plurality of pulses over a pulse duration a maximum value of the pulsed electrical charging voltage is greater than the maximum permissible energy-store voltage limit value, wherein the pulse duration is shorter than or equal to half a pulse period.

2. The method as claimed in claim 1, further comprising:
    b) driving an electronic circuit (18) in such a manner that an electrical charging voltage applied to the electronic circuit (18) is converted by the electronic circuit (18) into the pulsed electrical charging voltage.

3. The method as claimed in claim 1, further comprising:
    c) determining a charge state variable of the electrical energy store (1);
    d) comparing the determined charge state variable with a predefined charge state variable threshold value;
    e) if the charge state variable exceeds or reaches the predefined charge state variable threshold value, interrupting the charging of the electrical energy store (1).

4. The method as claimed in claim 1, wherein the pulse duration is less than 50 milliseconds.

5. The method as claimed claim 1, wherein a mean value of the pulsed electrical charging voltage over the pulse duration is greater than the maximum permissible energy-store voltage limit value.

6. The method as claimed in claim 1, wherein the pulsed electrical charging voltage over the pulse duration is greater than the maximum permissible energy-store voltage limit value.

7. A device for charging an electrical energy store (1), wherein the electrical energy store comprises at least one electrical energy storage unit (11, 12, 13), and a maximum permissible energy-store voltage limit value is specified for the electrical energy store (1), and wherein the device comprises an electronic circuit (18) for connecting to the electrical energy store (1) and an electronic control unit (16), wherein the electronic control unit (16) is configured to control charging of the electrical energy store (1) with a pulsed electrical charging voltage, wherein for each of a plurality of pulses over a pulse duration a maximum value of the pulsed electrical charging voltage is greater than the maximum permissible energy-store voltage limit value, wherein the pulse duration is shorter than or equal to half a pulse period.

8. The device as claimed in claim 7, wherein the electronic circuit comprises two power semiconductor switches (14, 15) which are connected in series in opposite directions.

9. A non-transitory, computer-readable storage medium containing instructions that when executed by a computer cause the computer to
    control charging of an electrical energy store (1) that includes at least one electrical energy storage unit (11, 12, 13), wherein a maximum permissible energy-store voltage limit value is specified for the electrical energy store (11, 12, 13), by charging the electrical energy store (1) with a pulsed electrical charging voltage, wherein for each of a plurality of pulses over a pulse duration a maximum value of the pulsed electrical charging voltage is greater than the maximum permissible energy-store voltage limit value, wherein the pulse duration is shorter than or equal to half a pulse period.

10. An electrical energy store (1), comprising:

at least one electrical energy storage unit (11, 12, 13); and
a device having an electronic circuit (18) for connecting to the electrical energy store (1) and an electronic control unit (16), wherein the electronic control unit (16) is configured to control charging of the electrical energy store (1) with a pulsed electrical charging voltage, wherein for each of a plurality of pulses over a pulse duration a maximum value of the pulsed electrical charging voltage is greater than a maximum permissible energy-store voltage limit value specified for the electrical energy store (11, 12, 13), wherein the pulse duration is shorter than or equal to half a pulse period.

* * * * *